United States Patent
Faccin et al.

(10) Patent No.: US 6,876,747 B1
(45) Date of Patent: Apr. 5, 2005

(54) METHOD AND SYSTEM FOR SECURITY MOBILITY BETWEEN DIFFERENT CELLULAR SYSTEMS

(75) Inventors: Stefano M. Faccin, Dallas, TX (US); Franck Le, Irving, TX (US)

(73) Assignee: Nokia Networks Oy, Espoo (FI)

(*) Notice: Subject to any disclaimer, the term of this patent is extended or adjusted under 35 U.S.C. 154(b) by 774 days.

(21) Appl. No.: 09/672,691

(22) Filed: Sep. 29, 2000

(51) Int. Cl.[7] .............................. H04K 1/00; H04L 9/00
(52) U.S. Cl. ...................... 380/247; 380/270; 380/272; 713/168
(58) Field of Search ................................. 380/247, 249, 380/270, 272, 279, 44–45; 713/168–171, 200–202; 455/410–411, 436–439

(56) References Cited

U.S. PATENT DOCUMENTS

| | | | | |
|---|---|---|---|---|
| 5,930,362 A | * | 7/1999 | Daly et al. .................. | 380/277 |
| 6,144,849 A | * | 11/2000 | Nodoushani et al. ........ | 455/419 |
| 6,393,270 B1 | * | 5/2002 | Austin et al. ................ | 455/411 |
| 6,687,243 B1 | * | 2/2004 | Sayers et al. ............... | 370/356 |

FOREIGN PATENT DOCUMENTS

| | | |
|---|---|---|
| WO | 0011835 | 3/2000 |
| WO | 0076194 | 12/2000 |

OTHER PUBLICATIONS

Puetz et al., "Secure Interoperation Between 2G and 3G Mobile Radio Networks", International Conference on 3G Mobile Communication Technologies, No. 471, Mar. 2000, pp. 28–32.

Garg V, K. et al., "Interworking and Interoperability Issues For North American PCS", IEEE Communications Magazine, IEEE Service Center, vol. 34, No. 3, Mar. 1996, pp. 94–99.

Lind, "3rd Generation Partnership Project (3GPP); Architecture Principles For Release 2000", Technical Specification Group Services and System Aspects, http://www.3gpp.org/ftp/tsg_sa/wg3_security/2000_meetings/tsgs3_12_stockholm/docs/pdf/s3–000246.pdf.

* cited by examiner

Primary Examiner—Hosuk Song
(74) Attorney, Agent, or Firm—Antonelli, Terry, Stout & Kraus, LLP

(57) ABSTRACT

Method and system for providing security mobility between two cellular systems. One or more ciphering keys are generated for a second cellular system by an interoperability authentication center at a first cellular system and by a mobile device separately. Traffic between the mobile device and the first cellular system is encrypted using one or more first ciphering keys for the first cellular system. A handover of the traffic of the mobile device from the first cellular system to the second cellular system is requested by the mobile device. After approval of handoff and before handoff, the one or more second ciphering keys are sent from the first cellular system to the second cellular system. The traffic is handed off by the mobile device from the first cellular system to the second cellular system. The traffic between the mobile device and the second cellular system is encrypted using the one or more second ciphering keys. The ciphering of the traffic is maintained during handoff.

24 Claims, 5 Drawing Sheets

METHOD AND SYSTEM FOR SECURITY MOBILITY BETWEEN DIFFERENT CELLULAR SYSTEMS

BACKGROUND

1. Field of the Invention

This invention relates to cellular networks, and more specifically to security mobility between different cellular networks.

2. Background Information

Mobile wireless devices such as cellular telephones are becoming increasingly more popular. Mobile cellular devices access a cellular system or network via a base station that receives the radio signals from the mobile device and transmits them to the cellular network. Generally, before a mobile terminal or device is given access to the cellular network, the mobile device must have been authorized to have access to the cellular network. Authentication is the process of determining whether a mobile device, terminal, or station is authorized to access the cellular system. Different cellular networks have adopted different algorithms to authenticate the users of mobile terminals and compute security keys used for encrypting traffic and/or other information transmitted over the interface between the mobile station and the cellular network after authentication.

A mobile station may roam away from access to its current cellular network into an area of another cellular network. The mobile station may desire or need the active traffic between the mobile station and the first cellular network be handed off to the new cellular network. In order to allow complete intersystem interworking, handover between the two different systems must be supported. For security reasons, it is may be desired to provide encryption of the mobile station's (i.e., user's) conversations and signaling messages before and after a call (or other information transmision) has been handed over to the new system. Different cellular network systems may have different ways of computing and distributing security keys that are used to provide encryption of the traffic. The differences between the computing and distributing of security keys of different cellular network systems usually resides in the procedures, parameters and algorithms of the different systems. In order to support handoff of traffic of a mobile station from one cellular system to another, mobility (i.e., interworking) between security mechanisms of the two cellular systems must exist.

Further, due to time requirements, it is not possible to perform the normal authentication at the second cellular system during handover. Authentication is usually a time consuming process, whereas handoff is usually a time sensitive process. Since authentication is not part of the handoff procedure, the appropriate keys for the target cellular system are not available at the target network before handoff. When a mobile device hands off from one system to another, ciphering has to be maintained beyond the handoff order and, therefore, the appropriate ciphering keys need to be available to the mobile device and to the network being handed off to (i.e., the base station of the cellular network).

Therefore, a need exists to provide distribution of the appropriate encryption keys when a subscriber (user) of a mobile station hands off from one cellular system to a different cellular system while avoiding a time consuming process to compute the keys.

SUMMARY

The present invention is directed to a method for providing security mobility between two cellular systems that includes: generating one or more second ciphering keys for a second cellular system where the one or more second ciphering keys are generated by an interoperability authentication center at a first cellular system and by a mobile device separately; encrypting traffic between the mobile device and the first cellular system using one or more first ciphering keys for the first cellular system; approving a handoff of the traffic of the mobile device from the first cellular system to the second cellular system; sending the one or more second ciphering keys from the first cellular system to the second cellular system; and performing handoff by the mobile device from the first cellular system to the second cellular system where traffic between the mobile device and the second cellular system is encrypted using the one or more second ciphering key. Ciphering of the traffic is maintained during handoff.

The present invention is further directed to a method for providing security mobility between two cellular systems that includes: requesting access to a first cellular system by a mobile device; initiating an authentication of the mobile device; generating at least one first ciphering key for a second cellular system where the at least one first ciphering key is generated by an interoperability authentication center at the first cellular system and by the mobile device separately, and where the interoperability authentication center stores security related algorithms and information for at least one cellular system including the second cellular system; authenticating the mobile device, where traffic between the mobile device and the first cellular system is encrypted using at least one second ciphering key for the first cellular system; approving a handoff of the traffic of the mobile device from the first cellular system to the second cellular system; sending the at least one first ciphering key from the first cellular system to the second cellular system; and performing handoff by the mobile device from the first cellular system to the second cellular system, where traffic between the mobile device and the second cellular system is encrypted using the at least one first ciphering key for the second cellular system. Ciphering of the traffic is maintained during the handoff.

The present invention is also directed to an article being a storage medium having instructions stored therein, where the instructions when executed cause a processing device to perform: storing at a first cellular system security related algorithms and information for at least one cellular system including a second cellular system; generating at least one ciphering key for the second cellular system; and sending the at least one ciphering key from the first cellular system to the second cellular system before a handoff of traffic from the first cellular system to the second cellular system.

The present invention is still further directed to an interoperability authentication center in a first cellular system, the interoperability authentication center having instructions stored therein, where the instructions when executed cause the intemperability authentication center to perform: storing security related algorithms and information for at least one cellular system including a second cellular system; generating at least one ciphering key for the second cellular system; and sending the at least one ciphering key from the first cellular system to the second cellular system before a handoff of traffic from the first cellular system to the second cellular system.

The present invention is also directed to a system for providing security mobility between two cellular systems that includes: at least one mobile device, a first cellular network, a gateway operably connected to the first cellular network, and a second cellular network operably connected to the gateway. The first network includes: at least one network element, where the at least one network element authenticates each at least one mobile device desiring access to the first cellular network, and traffic between the at least one mobile device and the first cellular system is encrypted using at least one first ciphering key for the first cellular network; and an interoperability authentication center (lauC), where the lAuC stores security related algorithms and information for at least one cellular network, and the lAuC is capable of generating at least one second ciphering key for each at least one cellular network, and the at least one mobile device is capable of generating the at least one second ciphering key for each at least one cellular network. The gateway transfers an at least one second ciphering key for the second cellular network from the first cellular network to the second cellular network before a handoff of the traffic from the first cellular network to the second cellular network, and after handoff the traffic between the at least one mobile device and the second cellular system is encrypted using the at least one second ciphering key for the second cellular network. Ciphering of the traffic is maintained during handoff.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
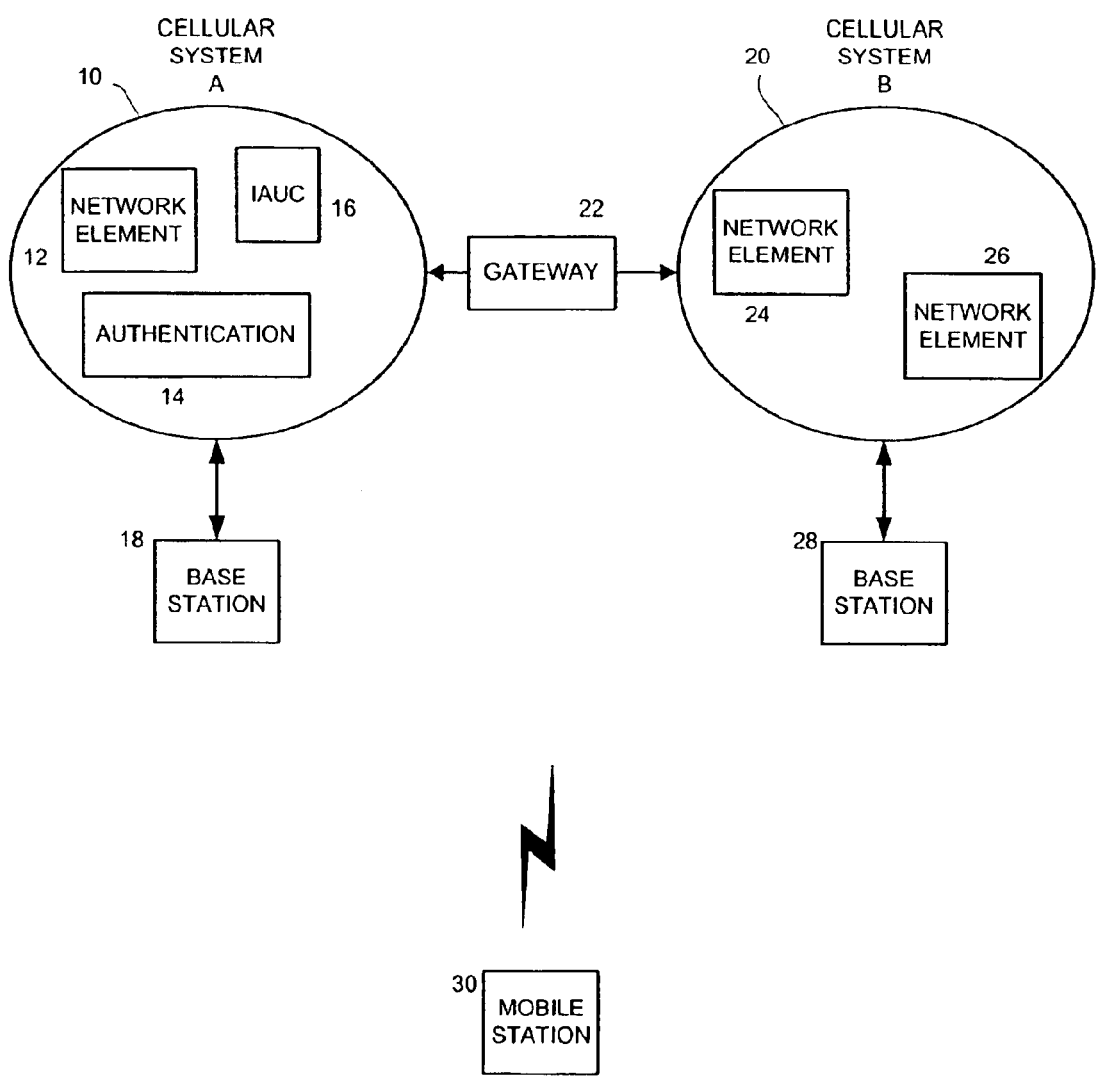
FIG. 1 is a diagram of an example system for security mobility between different cellular systems according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the Invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to methods and systems for security mobility between different cellular systems that incorporates an interoperability authentication center (lAuC) that contains the security algorithms and information of a cellular network that the user of the mobile device is handing off to. The lAuC provides distribution of the appropriate encryption keys when a mobile station hands off from one cellular system to another cellular system.

In methods and systems for security mobility between different cellular systems according to the present invention, a first cellular system distributes the appropriate encryption keys to the newly entered serving cellular system (second cellular system) before and/or during call handoff using the second cellular system's encryption key computation algorithms. An interoperability authentication center entity in the first cellular network contains the security algorithms and information of the second cellular network that the user of the mobile device is handing off to. The IAuC has security algorithms and information for all systems that the mobile device is allowed to handoff to. At handoff of a call (or other traffic or information) from a mobile device to the second cellular network, keys related to the second cellular network are transferred from the lAuC to the second cellular network. Therefore, ciphering of the traffic is maintained during call handoff from the first cellular system to second cellular system.

FIG. 1 shows a diagram of an example system for security mobility between different cellular systems according to an example embodiment of the present invention. Cellular system A, 10, is connected to a second cellular system B, 20, via a gateway 22. Cellular system A, 10, includes one or more network elements 12, one or more authentication network elements 14, and an interoperability authentication center element 16. Network element 12 may be any of a number of different types of functions or applications that are part of cellular system A10. Authentication network element 14 may consist of one network element, or multiple network elements that perform an authentication of mobile stations that desire access to cellular system A. Interoperability authentication center 16 may be a stand alone network element, or may be contained in an existing authentication center that is a part of authentication network elements 14. Cellular system A, 10, also may include a base station 18. Base station 18 provides wireless access to cellular system A for one or more mobile stations 30.

Similarly, cellular system B (usually a different type of cellular system than cellular system A), may contain various network elements 24, 26 that perform various functions or contain various applications. Cellular system B, 20, may also include base station 28 that provides wireless access to cellular system B for one or more mobile stations 30. Cellular system A, 10, and cellular system B, 20, may be any of a number of types of cellular systems, e.g., Global System for Mobile Communications (GSM) system, Universal Mobile Telecommunications Systems (UMTS) system, an Interim Standard (IS) system (e.g., IS-41, 41A, 41B, 41C, 41D, 54, 54B, 55, etc.), etc.

Figure 2:
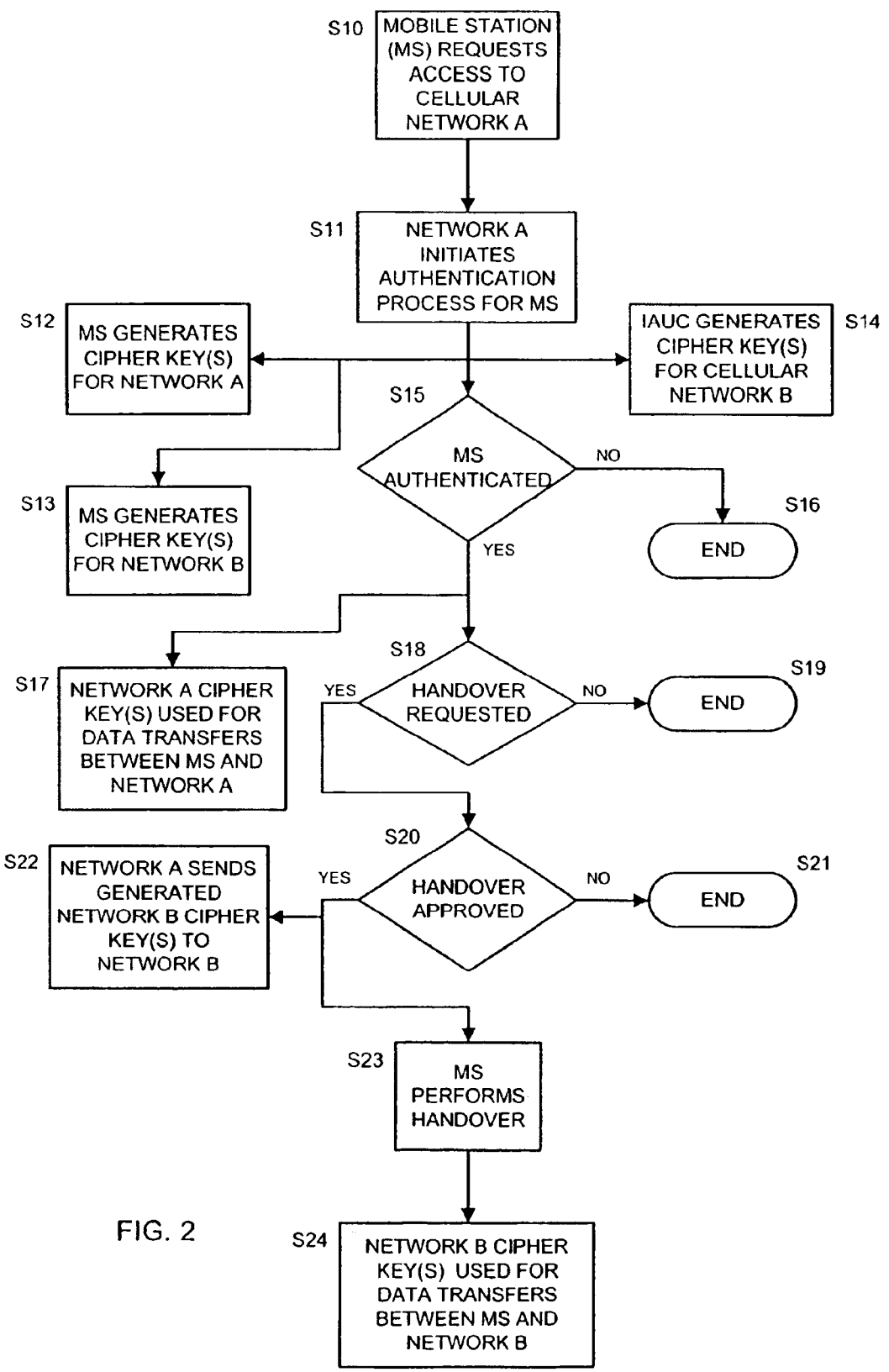
FIG. 2 is a flowchart of an example process for security mobility between different cellular systems according to an example embodiment of the present invention.

FIG. 2 shows a flowchart of an example process for security mobility between different cellular systems according to an example embodiment of the present invention. A mobile station or device requests access to a cellular system A, S10. Cellular network A then initiates an authentication process for the mobile station S11. The authentication process verifies that the mobile station desiring access to the cellular network is allowed to access the cellular network. As part of the authentication process, a network element of cellular network A may receive from the mobile station identification information and forward this identification information to an authentication element which will determine whether the mobile station is allowed access to cellular network A.

Authentication verification parameters may be generated and one or more of these sent to the mobile station. The mobile station may use one or more of these parameters and generate cipher keys for cellular network A, S12. The mobile station also generates one or more cipher keys for a cellular network B, S13. Cellular network B is a network that the mobile station may at some time need to handoff traffic to. One or more of the authentication parameters received from cellular network A may also be used to generate the cipher keys for cellular network B by the mobile station. Concurrently with the authentication process, an interoperability authentication center (lAuC) that resides at cellular network A generates the same one or more cipher keys for cellular network B, S14. Therefore, one or more cipher keys for cellular network B are independently generated by both the mobile station and at an lAuC at cellular network A.

A determination is made as to whether the mobile station has been authenticated S15. If the mobile station has not been authenticated (i.e., mobile station is not allowed access to cellular network A) then the process terminates S16. If the mobile station has been authenticated, then cellular network A and the mobile station use the generated cipher keys for cellular network A for future transfers of traffic and/or other information between the mobile station and cellular network A, S17.

At some point the mobile station, while actively transferring traffic between cellular network A, may roam into an area where cellular network B exists. Cellular network A may monitor whether a handoff request has been received from the mobile station S18. If there is no handoff request, the traffic is carried as normal and the process ends S19. However, if the mobile station has requested handoff of the traffic from cellular network A to cellular network B, information will be transferred between cellular network A and cellular network B to determine if the handoff is approved and may proceed S20. If the handoff is not approved, the process ends S21.

If the handoff is approved, cellular network A sends the generated cipher keys for cellular network B to cellular network B S22. The mobile station performs handoff from cellular network A to cellular network B of the traffic that is currently active between the mobile station and cellular network A S23. After handoff, the traffic and/or other information transferred between the mobile station and cellular network B is encrypted using the cipher keys for cellular network B, S24.

For example, assume that system A and the mobile station have established n ciphering keys whose formats are:

$KA1=[bit1\ bit2\ \ldots\ bit\ a1]$, $KA2=[bit1\ bit2\ \ldots\ bit\ a2]$,

. . .

$KAn=[bit1\ bit2\ \ldots\ bit\ an]$

At call handoff, if system B requires m keys (KB1, KB2, . . . , KBm) of variable length (b1, b2 . . . , bm), then the handoff gateway will derive them from KA1, KA2, KAn:

E.g., KB1=KA1=|KA2|KA3] if KB1 is 3 times longer than KA1 (where "|" is concatenated with), Or KB1 is the b1 lower bits of KA1, Or KB1=[bit1 of KA1|bit3 of KA1|bit2 of KA1|bit 4 of KA1]

The mobile station entering the new system knows the procedure to derive the keys and will, therefore, compute (KB1, KB2, . . ., KBm) in the same way as the handoff gateway. The handoff gateway will then forward the corresponding security keys to the new serving system as if the keys had been computed from another network but of the same system (i.e., same algorithm, procedure and formats as system B). The mobile station and network B will now use KB1, KB2,. . ., KBm.

Therefore, in methods and systems for security mobility between different cellular systems according to the present invention, handoff of traffic between the mobile station and cellular network A to cellular network B occurs without a lengthy authentication process for cellular network B. Further, security of the traffic is maintained in that the traffic is encrypted during hand off from cellular system A to cellular system B. The interoperability authentication center may use one or more authentication keys of the second cellular system B in the generation of the ciphering keys for cellular system B. The interoperability authentication center may contain cipher keys for all possible cellular networks that one or more mobile stations may be authorized to handoff to.

Figure 3:
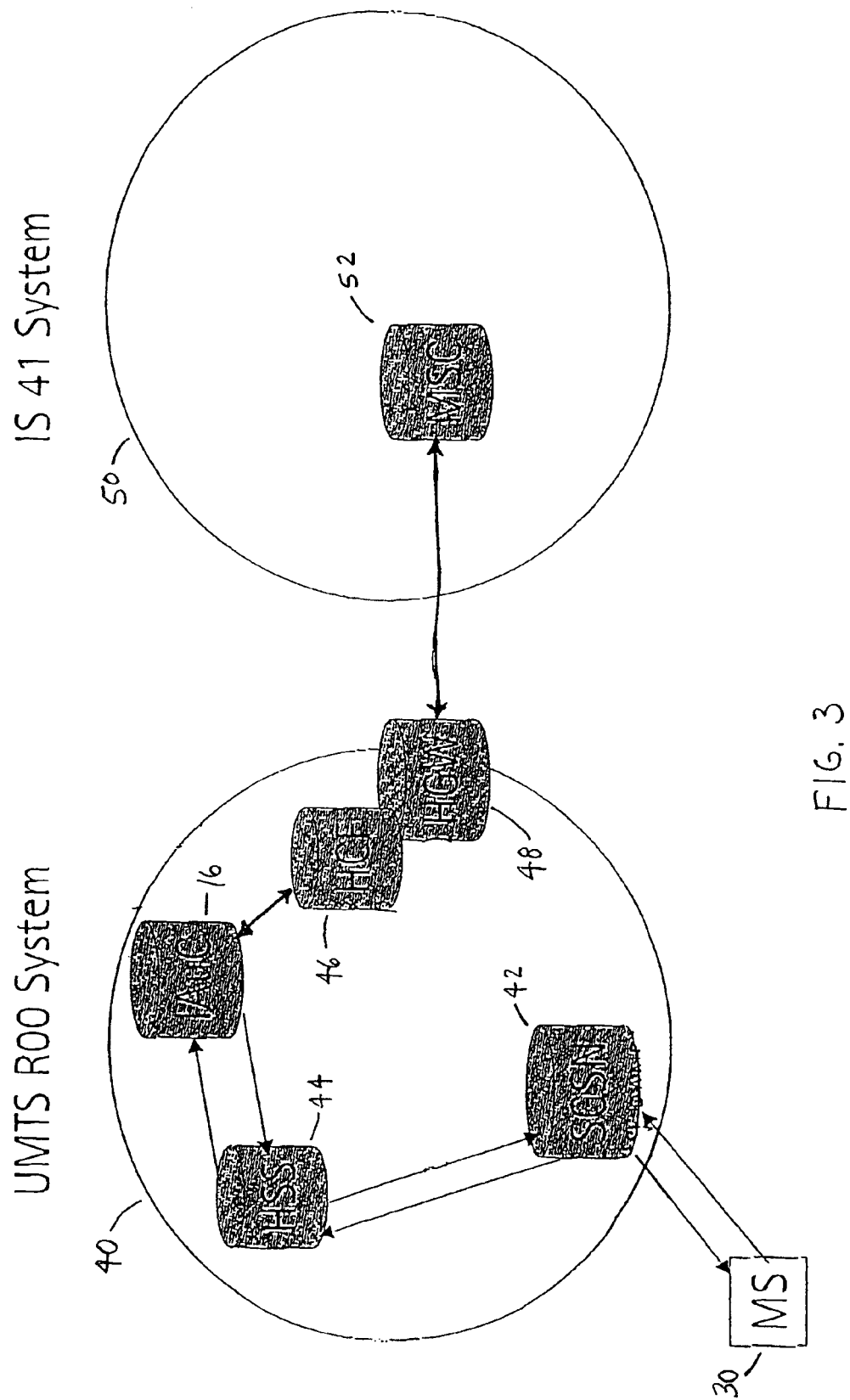
FIG. 3 is a diagram of an example system containing a Universal Mobile Telecommunication System (UMTS) and an Interim Standard (IS) 41 system according to an example embodiment of the present invention.

FIG. 3 is a diagram of an example system containing a Universal Mobile Telecommunication System (UMTS) and an Interim Standard (IS) 41 system according to an example embodiment of the present invention. In this example embodiment, a UMTS release 00 (R00) system and an IS-41 system will be used to illustrate the present invention. UMTS system 40 includes serving GPRS (General Packet Radio Service) support node (SGSN) 42, home subscriber system (HSS) 44, interoperability authentication center (lAuC) 16, handoff call function (HCF) 46, and handoff gateway (HGW) 48. A mobile station (MS) 30 communicates with UMTS system 40 in a wireless fashion through SGSN 42. The base station between mobile station 30 and SGSN 42 is not shown.

The home subscriber system may be a database with subscriber (i.e., users of the mobile terminals) profile information. The HSS also includes processing which includes an authentication center which may be used to generate keys to authenticate users. In this example embodiment, the HSS may use an AKA algorithm to generate ciphering keys for the UMTS system. The ciphering keys are used to encrypt traffic between the mobile station and the UMTS system.

IS 41 system 50 may include a number of network elements, one of which may be a mobile switching center (MSC) 52. Handoff gateway 48 provides an interface between handoff call function 46 and mobile switching center 52, thereby, providing an interface between UMTS system 40 and IS 41 system 50. Interoperability authentication unit 16 may be a part of home subscriber system 44 and still be within the spirit and scope of the present invention. Further, although specific network elements for both UMTS system 40 and IS 41 system 50 have been shown to illustrate the present invention, other network elements may exist in either UMTS system 40 and/or IS 41 system 50 and still be within the spirit and scope of the present invention.

Figure 4:
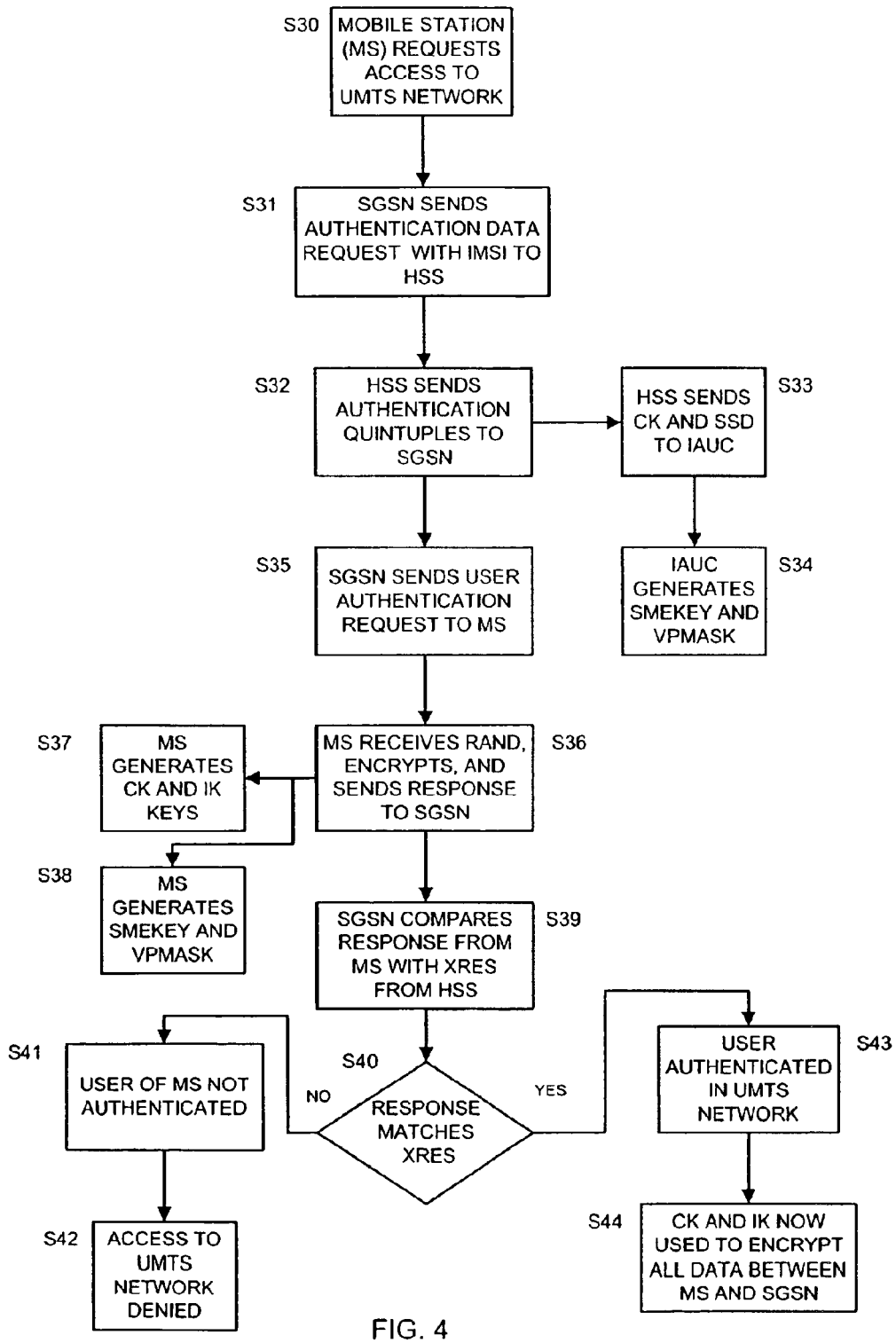
FIG. 4 is a flowchart of an example process of authentication of a mobile terminal at a UMTS network according to an example embodiment of the present invention.

FIG. 4 shows a flowchart of an example process of authentication of a mobile terminal at a UMTS network according to an example embodiment of the present invention. A mobile station requests access to the UMTS network S30. The SGSN sends an authentication data request to the HSS that includes an international mobile subscriber identity (IMSI) from the mobile terminal S31.

The HSS may generate one or more authentication parameters. In this example embodiment, five parameters are generated. The five authentication parameters may include: a random number generated by the HSS (RAND), an authentication number that serves as a sequence number (AUTHN), a ciphering key (CK), that is used for ciphering of data in the UMTS system, an integrity key (IK) used to ensure data integrity, and a parameter that is the encrypted value of the CK key (XRES). The CK is used to encrypt data between the mobile station and the UMTS system after authentication. Integrity key, IK, verifies that the data cannot be modified. It may be used in combination with CK to encrypt the data. A network entity of the radio access network (not shown) generally performs encryption and decryption for the UMTS system.

The HSS sends the authentication quintuples (e.g., RAND, AUTHN, CK, IK, and XRES) to the SGSN S32. The HSS also sends CK and a shared secret data (SSD) related to the IS 41 system, to the lAuC S33. The lAuC uses these values, along with an authentication key (A-key) for the IS 41 system, to generate ciphering keys for the IS 41 system, a Signaling Message Encryption key (SMEkey) and a Voice Privacy mask (VPmask) S34. The SGSN sends a user authentication request to the mobile station S35. The authentication request may include one or more of the quintuples, e.g., the RAND, and AUTHN parameters. The mobile station receives the RAND, generates a response, and sends the response to the SGSN S36. During authentication the mobile station may also generate the CK and IK keys S37. The mobile station may also generate the ciphering keys for the IS 41 system, e.g., SMEkey and VPmask S38. The SGSN compares the response from the mobile station with the XRES parameter from the HSS, S39. A determination is made if the response matches the XRES, S40. If the response does not match, the user of the mobile station is not authenticated S41. Therefore, access to the UMTS network will be denied to the mobile station S42. If the response matches, the user of the mobile station is authenticated in the UMTS network S43. The CK and IK keys will now be used by the mobile station and the base station of the UMTS system to encrypt all traffic or other information transfers between the mobile station and the UMTS system.

The interoperability authentication center may use a Cellular Authentication and Voice Encryption (CAVE) algorithm to generate the SMEkey and VPmask parameters. Further, the interoperability authentication center may use the CK key, a shared secret data (SSD) that relates to the IS 41 system, and an authentication key (A-KEY) that also relates to the IS 41 system in the CAVE algorithm to generate the SMEkey and VPmask ciphering keys. The A-key is stored at and only known by the mobile terminal, and the interoperability authentication center. The A-key is allocated to each mobile terminal that may access the IS 41 system and is allocated when the user of the mobile terminals subscribes. It is generally used for authentication in the IS 41 system.

Figure 5:
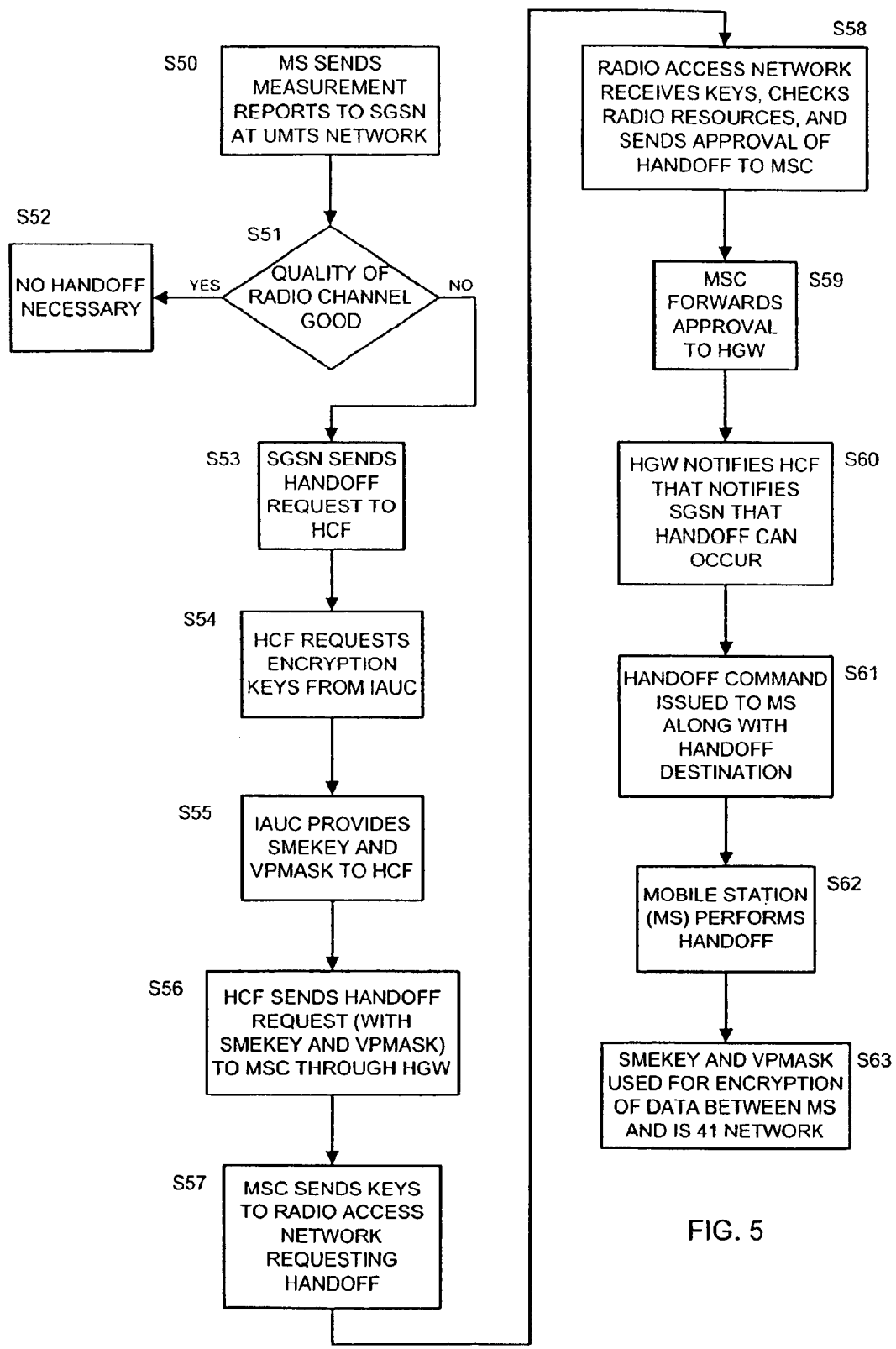
FIG. 5 is a flowchart of an example handoff process of traffic from a UMTS system to an IS 41 system according to an example embodiment of the present invention.

FIG. 5 shows a flowchart of an example handoff process of traffic from a UMTS system to an IS 41 system according to an example embodiment of the present invention. The mobile station sends radio measurement reports to the SGSN at the UMTS network S50. Radio measurement reports give information regarding the strength and signal quality of the radio communications between the mobile station and the UMTS network. A determination is made if the radio quality is good S51. If the radio quality is good, then the traffic can continue to be carried between the mobile station and the UMTS network, and no handoff is necessary S52. If the quality of the radio channel is not good, this suggests the possibility that the mobile station has roamed into an area where another cellular network exists. Therefore, the SGSN may send a handoff request to a handoff control function S53. The handoff control function may then request encryption keys for the network to be handed off to from the interoperability authentication center S54. The interoperability authentication center will provide the SMEkey and VPmask to the handoff control function S55. The handoff control function then sends a handoff request that includes the SMEkey and the VPmask to a mobile switching center of the IS 41 network through a handoff gateway S56. The mobile switching center at the IS 41 network then sends the SMEkey and VPmask to a base station, that is part of a radio access network, requesting handoff S57. The base station receives the two ciphering keys, checks radio resources of the IS 41 network, and sends approval of handoff to the mobile switching center S58.

The mobile switching center forwards this approval to the handoff gateway S59. The handoff gateway notifies the handoff control function which then in turn notifies the SGSN that handoff can occur S60. A handoff command is then issued to the mobile station along with a handoff destination in the IS 41 network S61. The mobile station will then perform the handoff from the UMTS network to the IS 41 network S62. For future traffic and all other information transfers between the mobile station and the IS 41 network, the SMEkey and VPmask will be used to encrypt the traffic and information. Therefore, according to the present invention, handoff is accomplished from the UMTS system to an IS 41 system while maintaining encryption of the traffic. Further, a lengthy authentication process for the IS 41 system is avoided.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for providing security mobility between two cellular systems comprising:
   requesting access to a first cellular system by a mobile device;
   authenticating the mobile device by the first cellular system;
   generating at least one second ciphering key for a second cellular system, the at least one second ciphering key generated by an interoperability authentication center at the first cellular system and by the mobile device separately, the generating being performed concurrently with the authenticating;
   encrypting traffic between the mobile device and the first cellular system using at least one first ciphering key for the first cellular system;
   approving a handoff of the traffic of the mobile device from the first cellular system to the second cellular system;
   sending the at least one second ciphering key from the first cellular system to the second cellular system; and
   performing handoff by the mobile device from the first cellular system to the second cellular system, traffic between the mobile device and the second cellular system being encrypted using the at least one second ciphering key, wherein ciphering of the traffic is maintained during handoff,
   wherein the authenticating comprises:
      sending an authentication request including an International Mobile Subscriber Identity (IMSI) of the mobile device to the authentication center at the first cellular system;
      generating authentication vectors by the authentication center, the authentication vectors including at least a value and an encrypted version of the value;
      sending the value to the mobile device;
      encrypting the value at the mobile device to create a response and sending the response to the first cellular system; and
      comparing the response with the encrypted version at the first cellular system, the mobile device being authenticated if the response and the encrypted version are the same.

2. The method according to claim 1, further comprising the interoperability authentication center storing security related algorithms and information for at least one cellular system including the second cellular system.

3. The method according to claim 1, wherein the first cellular system comprises a Universal Mobile Telecommunications System (UMTS) system.

4. The method according to claim 1, wherein the first cellular system comprises a Global System for Mobile Communications (GSM) system.

5. The method according to claim 1, wherein the second cellular system comprises an Interim Standard (IS) 41 system.

6. The method according to claim 5, wherein the at least one second ciphering key comprises a Signaling Message Encryption (SME) key and a Voice Privacy (VP) mask.

7. The method according to claim 1, wherein the generating the at least one second ciphering key comprises using a Cellular Authentication and Voice Encryption (CAVE) algorithm.

8. The method according to claim 7, wherein the CAVE algorithm uses at least one of an Authentication (A) key and Shared Secret Data (SSD) to generate the at least one second ciphering key, the A-key and the SSO used for authentication in the second cellular network.

9. The method according to claim 1, wherein at least one first ciphering key is used in the generating at least one second ciphering key.

10. The method according to claim 1, further comprising generating the at least one first ciphering key for the first cellular system by the mobile device.

11. The method according to claim 1, wherein the at least one first ciphering key for the first cellular system is part of the authentication vectors.

12. The method according to claim 1, wherein the first sending and the second sending are performed by a Serving GPRS (General Packet Radio Service) Support Node (SGSN).

13. The method according to claim 1, wherein the authentication center comprises a Home Subscriber System (HSS).

14. The method according to claim 1, wherein the authentication center comprises a Home Subscriber System (HSS).

15. The method according to claim 1, wherein the generating at least one second ciphering key for a second cellular system occurs at the authentication center.

16. A method for providing security mobility between two cellular systems comprising:
   requesting access to a first cellular system by a mobile device;
   initiating an authentication of the mobile device;
   generating at least one first ciphering key for a second cellular system, the at least one first ciphering key generated by an interoperability authentication center at the first cellular system and by the mobile device separately, the interoperability authentication center storing security related algorithms and information for at least one cellular system including the second cellular system;
   encrypting traffic between the mobile device and the first cellular system using at least one second ciphering key for the first cellular system;
   approving a handoff of the traffic of the mobile device from the first cellular system to the second cellular system;
   sending the at least one first ciphering key from the first cellular system to the second cellular system; and
   performing handoff by the mobile device from the first cellular system to the second cellular system, traffic between the mobile device and the second cellular system being encrypted using the at least one first ciphering key for the second cellular system, wherein ciphering of the traffic is maintained during the handoff
   wherein the authenticating comprises:
      sending an authentication request including an International Mobile Subscriber Identity (IMSI) of the mobile device to the authentication center at the first cellular system;
      generating authentication vectors by the authentication center the authentication vectors including at least a value and an encrypted version of the value;
      sending the value to the mobile device;
      encrypting the value at the mobile device to create a response and sending the response to the first cellular system; and
      comparing the response with the encrypted version at the first cellular system, the mobile device being authenticated if the response and the encrypted version are the same.

17. The method according to claim 16, wherein the first cellular system comprises a Universal Mobile Telecommunications System (UMTS) system.

18. The method according to claim 16, wherein the second cellular system comprises an Interim Standard (IS) 41 system.

19. The method according to claim 18, wherein the at least one first ciphering key comprises a Signaling Message Encryption (SME) key and a Voice Privacy (VP) mask.

20. The method according to claim 16, wherein at least one second ciphering key is used in the generating at least one first ciphering key.

21. A system for providing security mobility between two cellular systems comprising:
   at least one mobile device;
   a first cellular network, the first network comprising:
      at least one network element, the at least one network element authenticating each at least one mobile device desiring access to the first cellular network, traffic between the at least one mobile device and the first cellular system being encrypted using at least one first ciphering key for the first cellular network; and
      an interoperability authentication center (lAuC), the lAuC storing security related algorithms and information for at least one cellular network, the lAuC capable of generating at least one second ciphering key for each at least one cellular network, the at least one mobile device capable of generating the at least one second ciphering key for each at least one cellular network;
   a gateway operably connected to the first cellular network;
   a second cellular network operably connected to the gateway, the gateway transferring an at least one second ciphering key for the second cellular network from the first cellular network to the second cellular network before a handoff of the traffic from the first cellular network to the second cellular network, after handoff the traffic between the at least one mobile device and the second cellular system being encrypted using the at least one second ciphering key for the second cellular network, wherein ciphering of the traffic is maintained during handoff
   wherein the authenticating comprises:
      sending an authentication request including an International Mobile Subscriber Identity (IMSI) of the mobile device to the authentication center at the first cellular system;
      generating authentication vectors by the authentication center, the authentication vectors including at least a value and an encrypted version of the value;
      sending the value to the mobile device;
      encrypting the value at the mobile device to create a response and sending the response to the first cellular system; and
      comparing the response with the encrypted version at the first cellular system, the mobile device being authenticated if the response and the encrypted version are the same.

22. The system according to claim 21, wherein the first cellular network comprises a Universal Mobile Telecommunications System (UMTS) system.

23. The system according to claim 21, wherein the second cellular network comprises an Interim Standard (IS) 41 system.

24. The method according to claim 21, wherein at least one first ciphering key is used in the generating at least one second ciphering key.

* * * * *